(12) United States Patent
Jamieson

(10) Patent No.: US 9,267,708 B2
(45) Date of Patent: Feb. 23, 2016

(54) GAS-FIRED HEATER WITH CARBON DIOXIDE DETECTOR

(71) Applicant: Enerco Group, Inc., Cleveland, OH (US)

(72) Inventor: Donald R. Jamieson, Oakville (CA)

(73) Assignee: Enerco Group, Inc., Cleveland, OH (US)

( * ) Notice: Subject to any disclaimer, the term of this patent is extended or adjusted under 35 U.S.C. 154(b) by 0 days.

(21) Appl. No.: 14/518,280

(22) Filed: Oct. 20, 2014

(65) Prior Publication Data

US 2015/0050607 A1   Feb. 19, 2015

Related U.S. Application Data

(63) Continuation of application No. 13/705,888, filed on Dec. 5, 2012, now Pat. No. 8,893,707, which is a continuation of application No. 12/544,442, filed on Aug. 20, 2009, now Pat. No. 8,347,875.

(60) Provisional application No. 61/122,165, filed on Dec. 12, 2008.

(51) Int. Cl.
| | |
|---|---|
| *F24H 9/20* | (2006.01) |
| *F24C 3/12* | (2006.01) |
| *F24C 3/14* | (2006.01) |
| *F24H 3/04* | (2006.01) |
| *F23N 1/00* | (2006.01) |
| *F23N 5/00* | (2006.01) |

(52) U.S. Cl.
CPC .............. *F24H 9/2085* (2013.01); *F23N 1/002* (2013.01); *F23N 5/003* (2013.01); *F24C 3/122* (2013.01); *F24C 3/14* (2013.01); *F24H 3/0488* (2013.01); *F23N 2029/02* (2013.01); *F23N 2037/02* (2013.01)

(58) Field of Classification Search
CPC .......... F24C 3/122; F24C 3/14; F24H 3/0488; F24H 9/2085; F23N 1/002; F23N 5/003; F23N 2037/02; F23N 2029/02
See application file for complete search history.

(56) References Cited

U.S. PATENT DOCUMENTS

| | | | |
|---|---|---|---|
| 1,639,780 | A | 8/1927 | Mulholland |
| 3,139,879 | A | 7/1964 | Bauer et al. |
| 3,590,806 | A | 7/1971 | Lock |

(Continued)

FOREIGN PATENT DOCUMENTS

| | | |
|---|---|---|
| GB | 253043 | 6/1926 |
| JP | 54-116747 | 9/1979 |

(Continued)

OTHER PUBLICATIONS

O'Meara Camping Centers (web page), Cookers & Heaters, "Alvima Carasol 3b Heater," data sheets, pp. 1-7, Jun. 26, 2002.

(Continued)

*Primary Examiner* — Alfred Basichas
(74) *Attorney, Agent, or Firm* — Brouse McDowell; Michael G. Craig

(57) ABSTRACT

One or more techniques and/or systems are disclosed for a portable gas-fired heater comprising a housing, a burner assembly, and a carbon dioxide detector system. The housing may, at least, partially enclose one or more fuel sources. The burner assembly can be enclosed by, and recessed into, the housing.

18 Claims, 20 Drawing Sheets

(56) References Cited

U.S. PATENT DOCUMENTS

| | | |
|---|---|---|
| 3,814,573 A | 6/1974 | Karlovetz |
| D243,694 S | 3/1977 | Faulkner |
| 4,201,544 A | 5/1980 | Briggs et al. |
| 4,307,701 A | 12/1981 | Balon et al. |
| 4,340,362 A | 7/1982 | Chalupsky et al. |
| 4,348,172 A | 9/1982 | Miller |
| 4,640,680 A | 2/1987 | Schilling |
| 4,782,814 A | 11/1988 | Cherryholmes |
| 4,843,313 A | 6/1989 | Walton |
| 4,848,313 A | 7/1989 | Velie |
| 5,090,899 A | 2/1992 | Kee |
| 5,174,751 A | 12/1992 | Chapman et al. |
| 5,239,979 A | 8/1993 | Maurice et al. |
| 5,470,018 A | 11/1995 | Smith |
| 5,546,925 A | 8/1996 | Knight et al. |
| 5,628,303 A | 5/1997 | Ahmady et al. |
| 5,645,043 A | 7/1997 | Long et al. |
| D391,345 S | 2/1998 | Mandir et al. |
| 5,807,098 A | 9/1998 | Denf |
| 5,838,243 A | 11/1998 | Gallo |
| 5,848,585 A | 12/1998 | Long et al. |
| 5,865,618 A | 2/1999 | Hiebert |
| 5,941,699 A | 8/1999 | Abele |
| 5,984,663 A | 11/1999 | Joyce |
| D445,889 S | 7/2001 | Resmo et al. |
| D447,796 S | 9/2001 | Resmo et al. |
| 6,340,298 B1 | 1/2002 | Vandrak et al. |
| 6,446,623 B1 | 9/2002 | Resmo et al. |
| 6,575,154 B1 | 6/2003 | Freeman et al. |
| 6,619,281 B2 | 9/2003 | Resmo et al. |
| 6,648,635 B2 | 11/2003 | Vandrak et al. |
| 6,742,814 B2 | 6/2004 | Resmo et al. |
| 6,792,937 B2 | 9/2004 | Resmo et al. |
| 6,843,244 B2 | 1/2005 | McCalley et al. |
| 6,884,065 B2 | 4/2005 | Vandrak et al. |
| 7,018,200 B2 | 3/2006 | Querejeta et al. |
| 7,300,278 B2 | 11/2007 | Vandrak et al. |
| 8,434,469 B2 | 5/2013 | Vandrak |
| 2005/0037303 A1 | 2/2005 | Bachinski et al. |
| 2005/0263705 A1* | 12/2005 | Asatani .............. F24C 5/16 250/341.1 |
| 2008/0168955 A1* | 7/2008 | Huang ................ F23N 5/003 122/14.21 |

FOREIGN PATENT DOCUMENTS

| | | |
|---|---|---|
| JP | 55-051233 | 4/1980 |
| WO | 2007036071 A1 | 4/2007 |
| WO | 2007/112089 A2 | 10/2007 |

OTHER PUBLICATIONS

Dynamx Incorporated Warehouse Appliance (web page), Williams-Heaters—Vent-Free Honts,, . . . Models, data sheets, pp. 1-4, Jun. 26, 2002.

AGA, American Gas Association, Fact Sheet, "Oxygen Depletion Sensing (ODS) Systems," Dec. 1984.

Brians of Sheerness, Valor Fires, data sheets, pp. 1-2, Mar. 6, 2002.

Mobil Mobile Gas Supplies, Thurcroft Stove, data sheets, pp. 1-2, Mar. 6, 2002. e Gas Supplies, Thurcroft Stove, data sheets, pp. 1-2.

Mobile Gas Supplies, Mobile Heaters, data sheets, pp. 1-4, Mar. 6, 2002.

Bullfinch (Gas Equipment) Limited, The Simba Range Ultra Safe-Low Cost Mobile Cabinet Heaters, 2 pages.

The Coleman Co., Inc., 3000 BTU Propane Catalytic Heater, instructions for use, pp. 1-4.

PCT International Search Report and The Written Opinion of the International Searching Authority from International Application No. PCT/US2004/32071 mailed on Jun. 14, 2005.

PCT International Search Report and The Written Opinion of the International Searching Authority from International Application No. PCT/US2007/07426 mailed on Sep. 28, 2007.

* cited by examiner

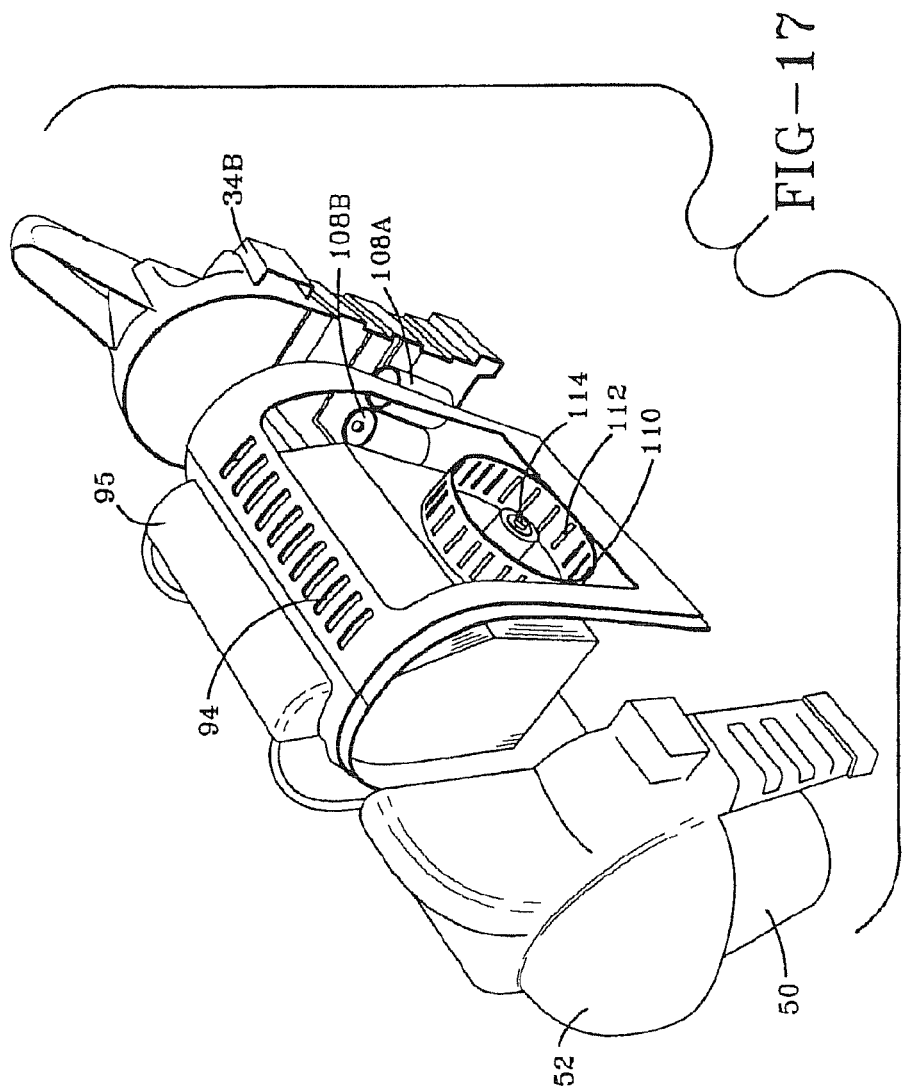

GAS-FIRED HEATER WITH CARBON DIOXIDE DETECTOR

CROSS-REFERENCE TO RELATED APPLICATIONS

This application is a continuation application of U.S. Ser. No. 13/705,888 filed Dec. 5, 2012, which is a continuation of and claims priority to U.S. application Ser. No. 12/544,442, now U.S. Pat. No. 8,347,875, entitled GAS-FIRED HEATER WITH CARBON DIOXIDE DETECTOR, filed Aug. 20, 2009, which claims priority to U.S. Provisional Application No. 61/122,165 entitled GAS-FIRED HEATER WITH CARBON DIOXIDE DETECTOR, filed Dec. 12, 2008, all of which are incorporated herein by reference.

BACKGROUND

Gas-fired portable heaters are used in multiple environments. The heater typically includes a housing having a combustion chamber. The housing has an inlet for receiving air into the chamber. A mixture of fuel and air is introduced into the chamber where combustion occurs, to provide a heat. Often, a plenum directs the heat toward a heating surface, to distribute it over the surface thereof.

These types of heaters are often used for outdoor use due to the emission of carbon monoxide and other potentially harmful combustion products. Prior designs of these types of heaters are typically not considered safe for operation in an enclosed environment, such as small recreational enclosures, including tents, truck-caps, fishing huts, trailers, vans, etc. These prior designs may not meet safety certification targets regarding combustion requirements (e.g., release of combustion products) at a high and low firing condition and at a reduced pressure, or other safety requirements.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, a portable gas-fired heater comprising a housing, a burner assembly, and a carbon dioxide detector system. The housing is adapted to at least partially enclose at least one fuel source. The burner assembly may also be enclosed by the housing.

In one implementation, a portable gas-fired infrared heater can comprise a housing, a regulator, burner assembly, a radiant surface, a plenum chamber, and a carbon dioxide detector system. Further, in one implementation, the housing can comprises a handle configured to facilitate transporting the heater, and the housing may also comprise an air inlet. In one implementation, the burner assembly can be mounted within the housing. Additionally, in one implementation, the burner assembly may comprise a fuel valve configured to control fluid communication with a fuel source; and may also comprise a venturi that can be used to mix air from the air inlet and fuel from the fuel valve into a fuel-air mixture. In one implementation, the radiant surface can be recessed into the housing and disposed at an angle to vertical; and the radiant surface can also comprise a rear face. In one implementation, the plenum chamber can be disposed adjacent to the radiant surface and in fluid communication with the radiant surface; and the plenum chamber can be configured to distribute the fuel-air mixture onto the rear face of the radiant surface. In one implementation, the carbon dioxide detector system can be configured to cause the fuel valve shut off in response to a detection of a predetermined level of carbon dioxide.

In one implementation, a portable gas-fired radiant heater can comprise a housing, a fuel source, a fuel connection fitting, an air inlet, a burner assembly, a radiant surface, and an automatic shutoff mechanism. In this implementation, the burner assembly can be mounted within the housing, and can comprise a fuel valve that can be configured to control fluid communication with said fuel source. The radiant surface can be disposed in the housing and configured to function as a combustion site. The automatic shutoff mechanism can be operatively coupled with the burner assembly, and configured to cause the fuel valve to shut off in response to a detection of a predetermined level of carbon dioxide.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein:

FIG. 17 is a top perspective exploded view of one implementation of a portable heater;

DETAILED DESCRIPTION

Figure 1:
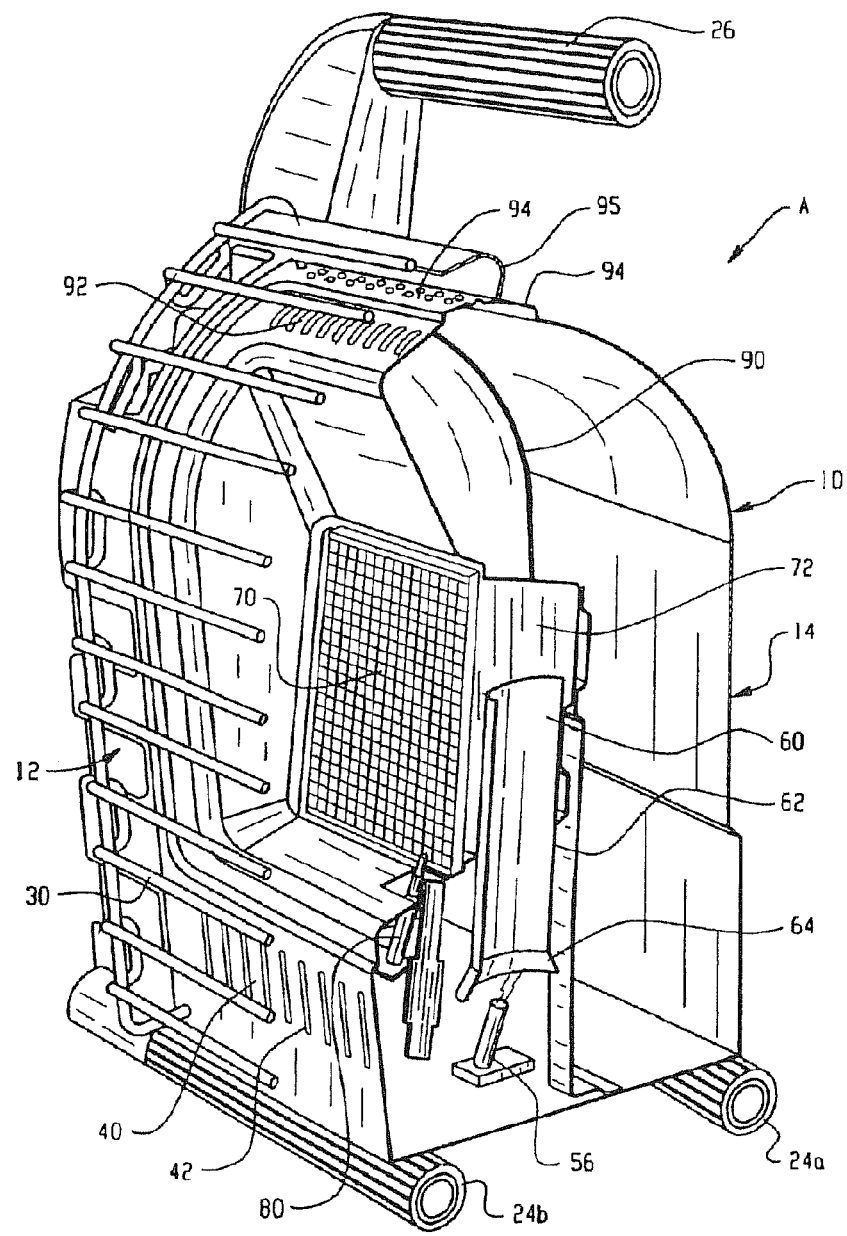
FIG. 1 is a perspective cross-sectional view of one implementation of a heater assembly.
Figure 2:
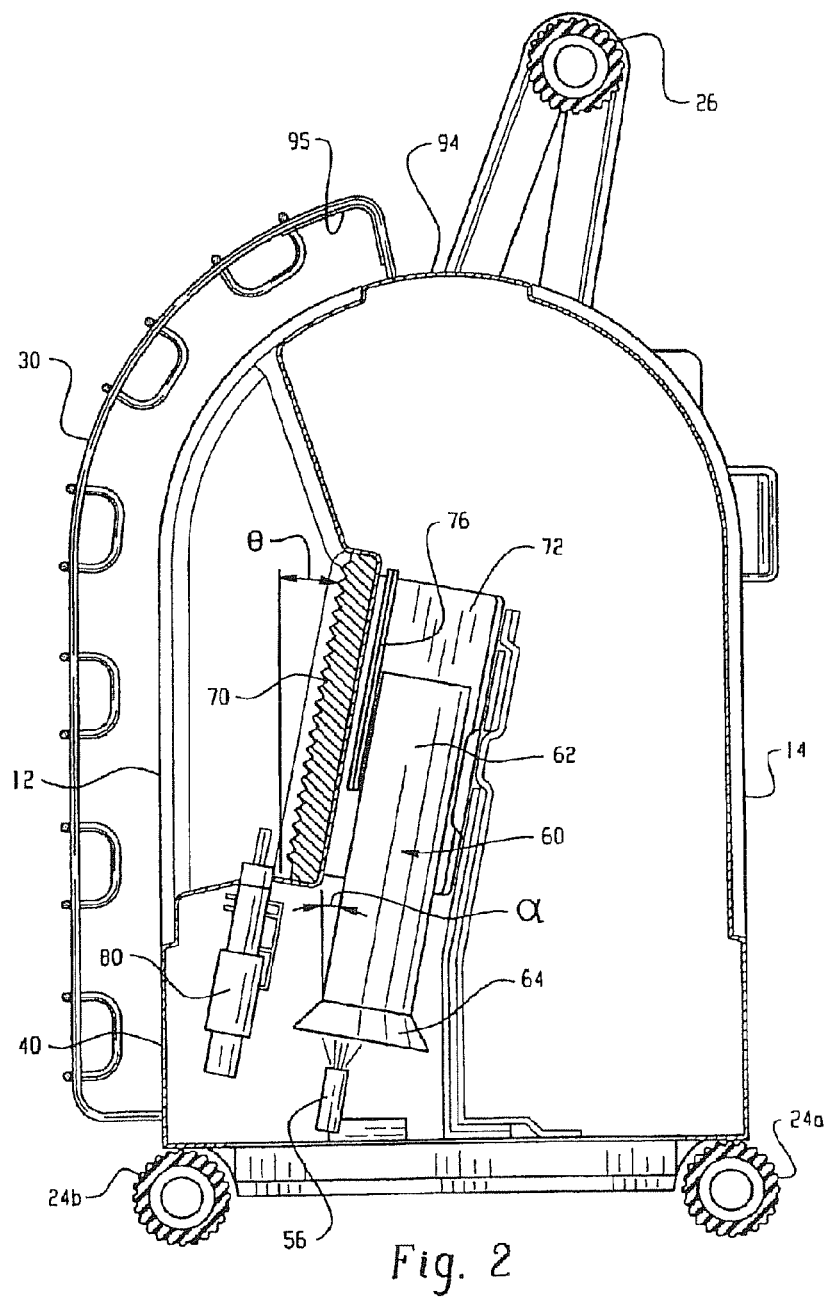
FIG. 2 is a longitudinal cross-sectional view of one implementation of a heater assembly.
Figure 3:
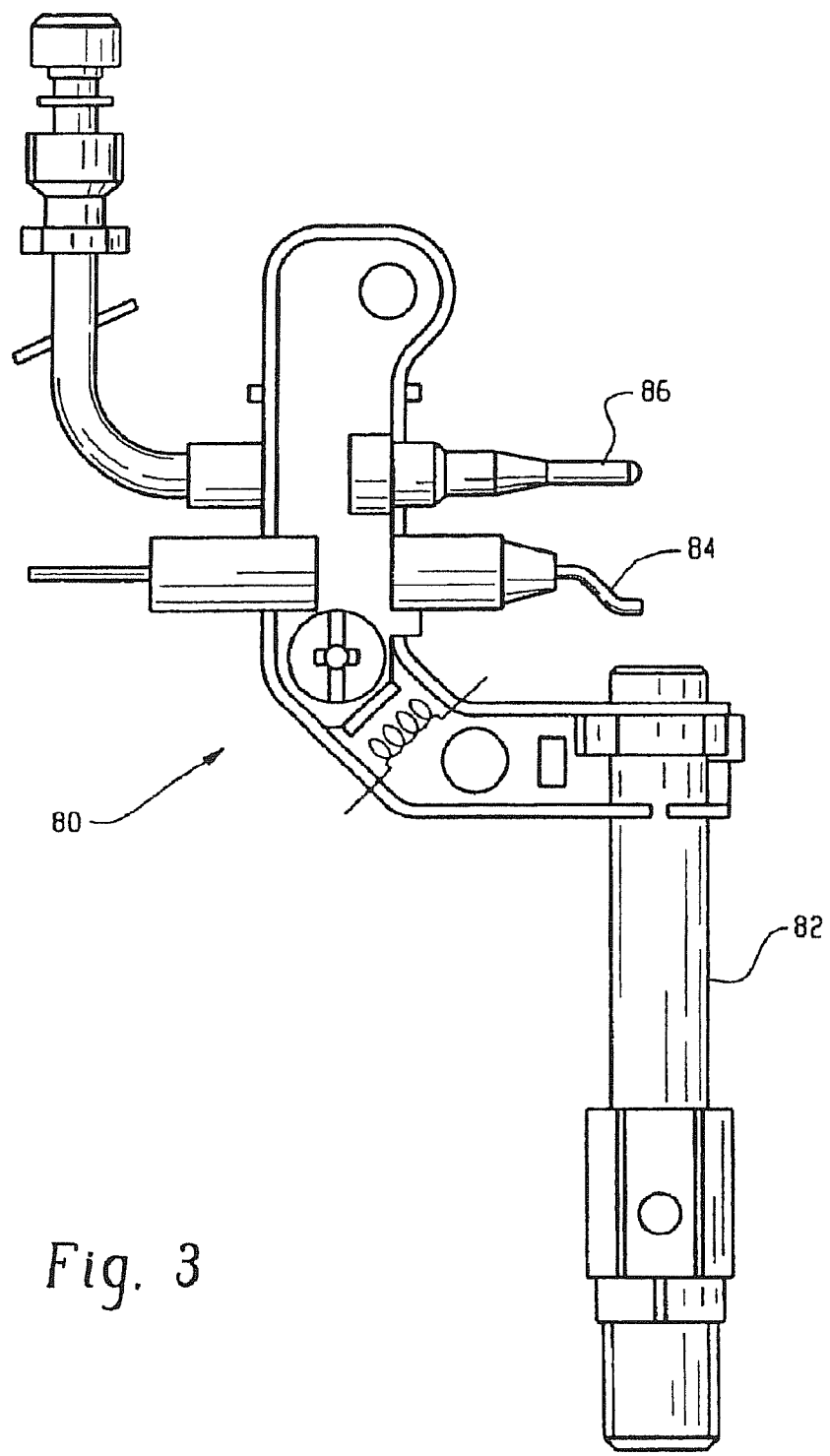
FIG. 3 is an enlarged elevation view of one implementation of a one or more portions of a heater assembly.
Figure 4:
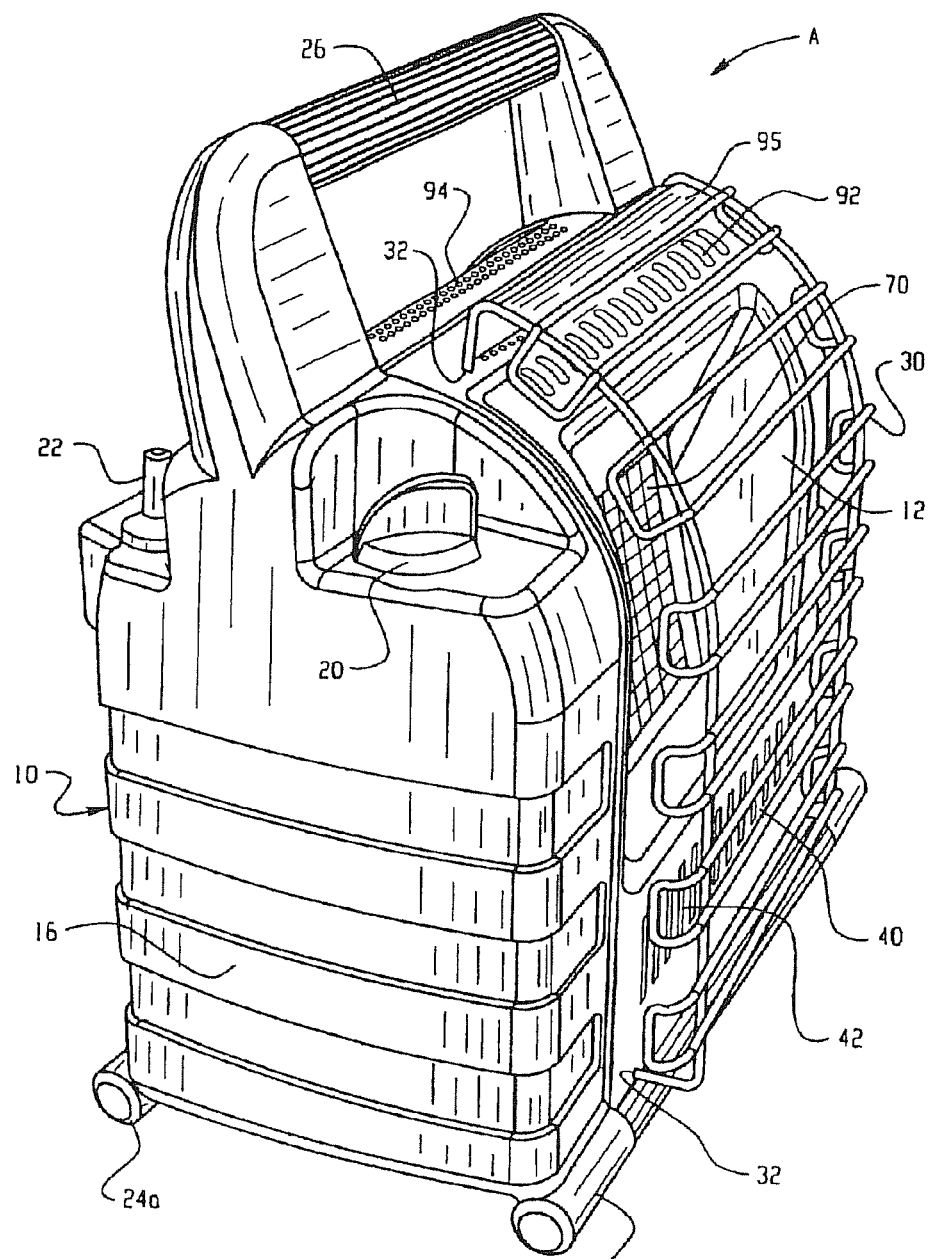
FIG. 4 is a perspective view of one implementation of a heater taken generally from the front and left-hand side.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

Referring now to the drawings wherein the showings are only for purposes of illustrating certain implementations of the heater, and not for purposes of limiting same, the Figures show a portable heating device that may be used in enclosed environments.

Referring, without limitation, to the implementation depicted in FIGS. 1-27, the portable heater A includes a housing 10 having a front face 12, a rear face 14, and two sides 16, 18. The housing 10 may be manufactured to have smooth contours to mitigate snagging or catching of things such as clothing, fabric, etc. A stepped recess or external cavity may be formed in a corner region of the left side 16 of the housing 10 for supporting a control knob or temperature controller 20. A recess can be used to facilitate protection against inadvertent contact and/or accidental alteration of a control knob setting, for example, which may result in a changing of the temperature setting. In certain implementations, the temperature controller 20 may comprise four positions, such as: off, pilot, low, and high (not shown). In certain implementations, the temperature controller 20 may comprise continuously variable positions for infinitely variable heating. A controller may incorporate a piezoelectric spark igniter, which can be disposed integrally with the controller stem, for example, and may be activated by rotation of the controller stem.

In certain implementations, the heater A can be supported by two elongated legs 24a, 24b laterally disposed along the outboard edges of the rear face 14 and front face 12 respectively. In one implementation, the legs 24a, 24b may be grooved to provide a friction surface to contact a supporting surface and may extend over a portion (e.g., the entire width) of the housing to provide a wide "footprint" and stable support area for the heater. In another implementation (not shown), additional legs extending front to rear can be provided beneath legs 24a, 24b, for example, to increase air flow beneath the heater. A handle 26 may extend from the top of the heater. In certain implementations the handle 26 can be formed at an angle directed away from the front face 12. In certain implementations this angle may be approximately 15 degrees. As an example, an angle may allow the handle 26 to remain cool for handling by a user as the angled orientation of the handle 26 can mitigate exposure of the user's hand to heat exiting the top of the heater A while the user transports the heater A. In the alternative, a non-angled handle (not shown) provides a grip surface for carriage of the heater. The handle 26 may optionally be grooved to provide an enhanced gripping surface for the user.

In certain implementations, a shield or metal grid 30 can be engaged with the front face 12 of the heater, for example, to mitigate contact with the heating components and/or as a safeguard for a user. In addition, the shield may mitigate accidental contact with the hot portions of the heater front face 12 by the user. The shield may be made from wire or elongated metal strips. In certain implementations, peripheral pieces of the shield may be received in openings 32 in the housing to secure the shield to the heater. In certain implementations, keyhole openings or recesses 34a, 34b can be disposed on the upper portion of the back face 14 of the heater, for example, which may allow the user to hang the heater.

The air inlet 40 may comprise any appropriate opening that provides adequate air inflow, for example, for the purposes of combustion and/or air/fuel mixing. In certain implementations, an opening or air inlet 40 is disposed on a lower portion of the front face 12 of the heater for receiving and filtering air drawn into the housing. In certain implementations the air inlet is formed from a series of elongated slits 42 spaced across the housing beneath the shield.

Figure 5:
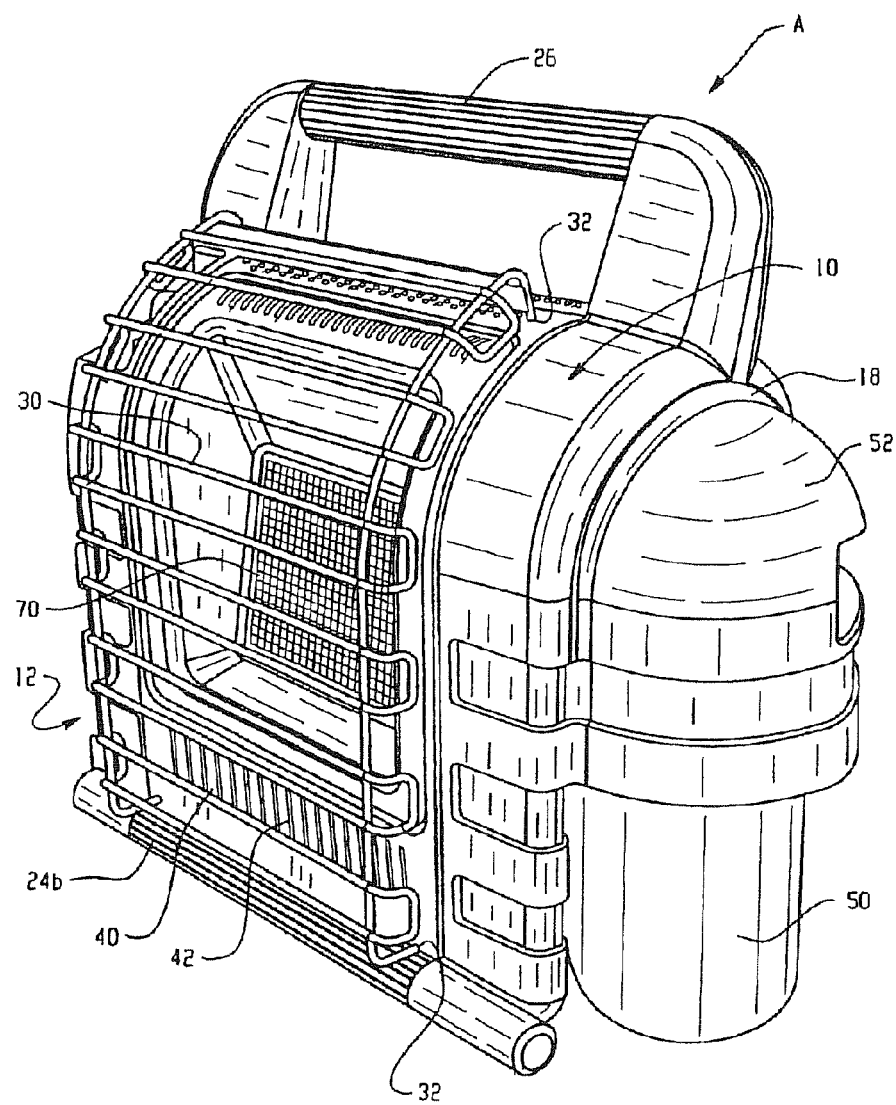
FIG. 5 is a perspective view of one implementation of a heater taken generally from the front and right-hand side.
Figure 6:
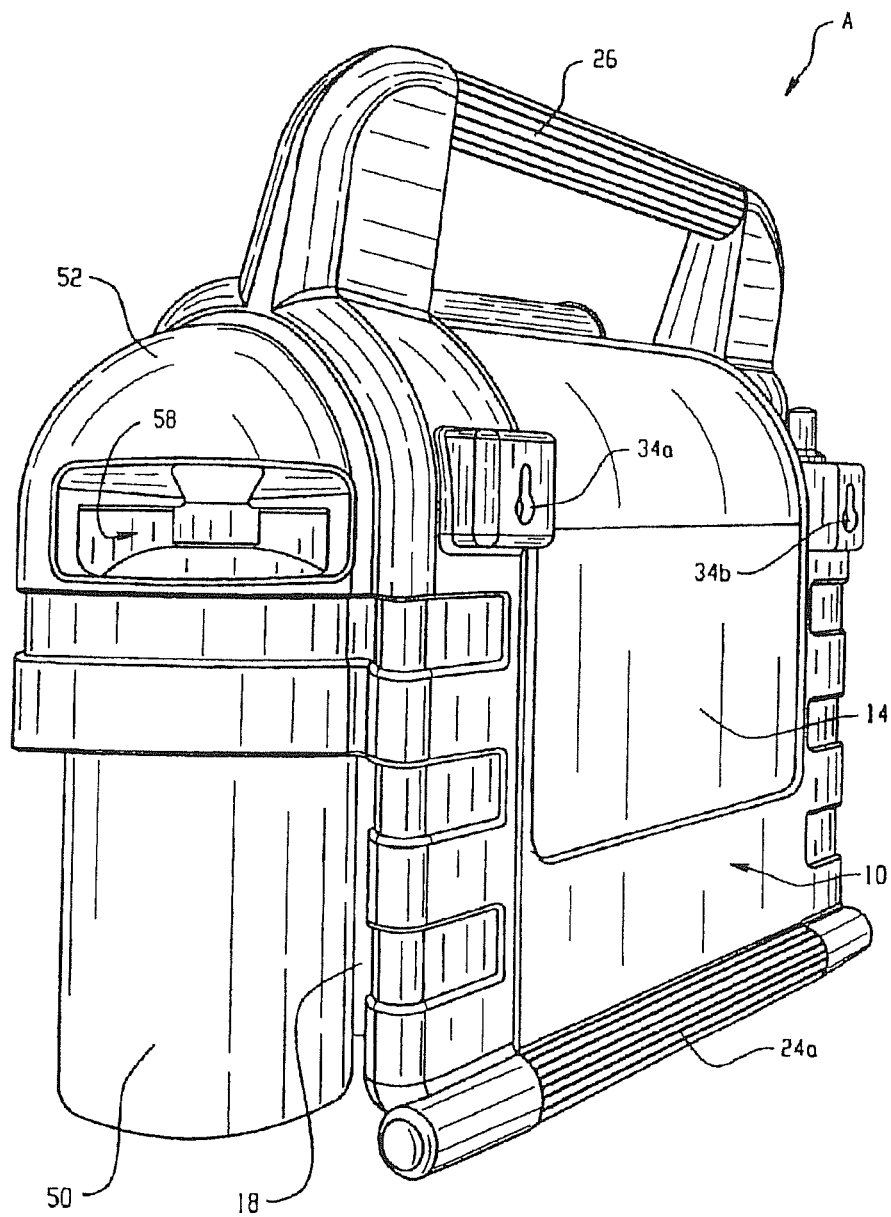
FIG. 6 is a perspective view of one implementation of a heater taken generally from the rear and right-hand side.
Figure 7:
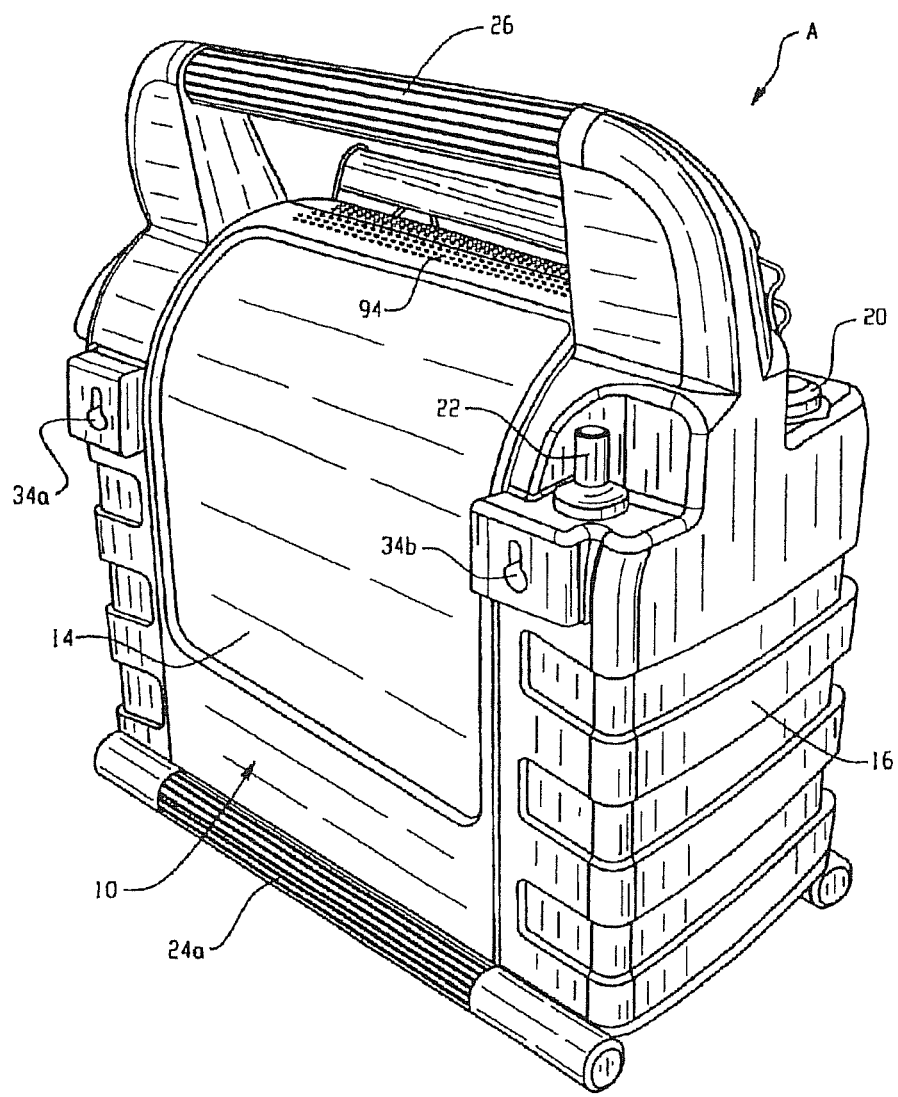
FIG. 7 is a perspective view of one implementation of a heater taken generally from the rear and left-hand side.
Figure 8:
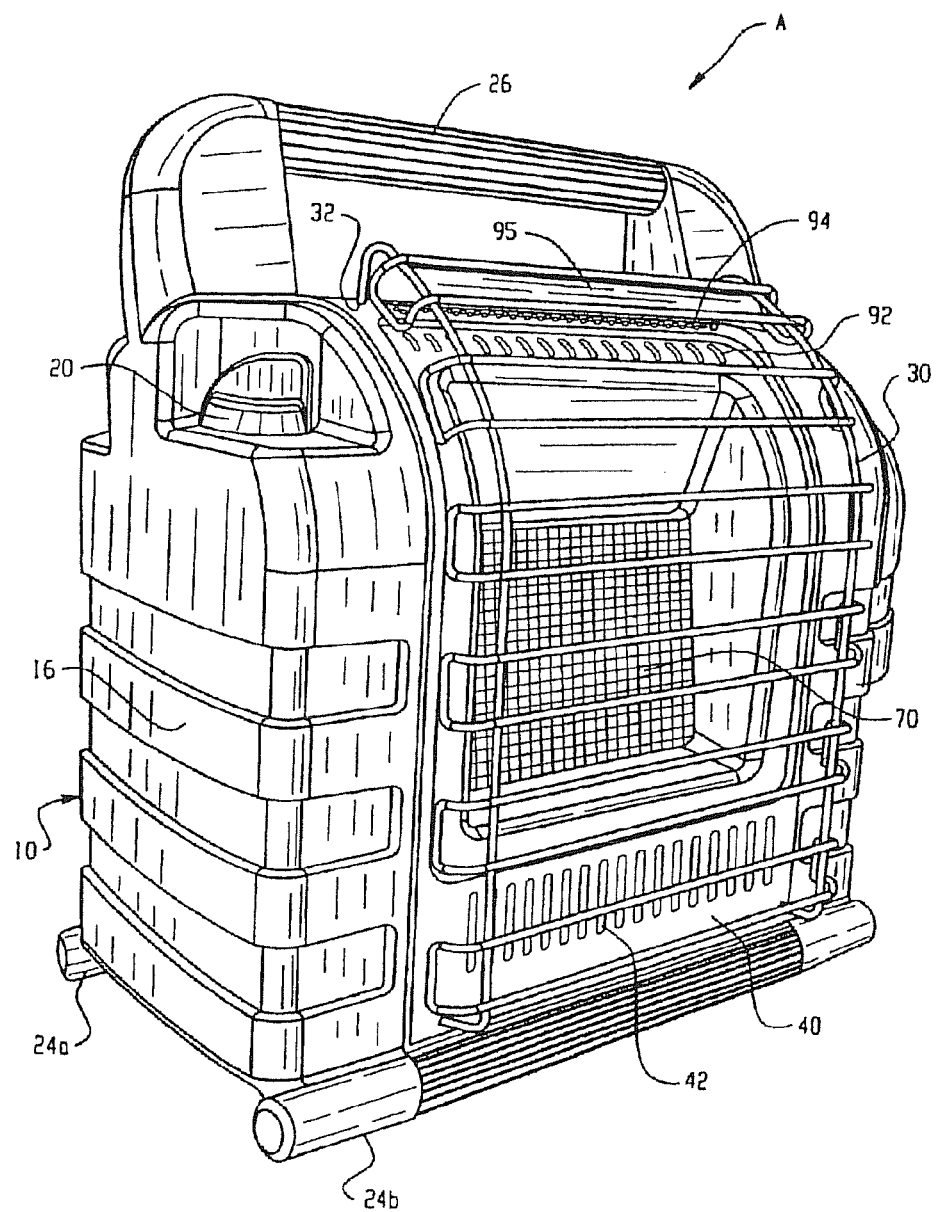
FIG. 8 is a perspective elevation view of one implementation of a heater.
Figure 9:
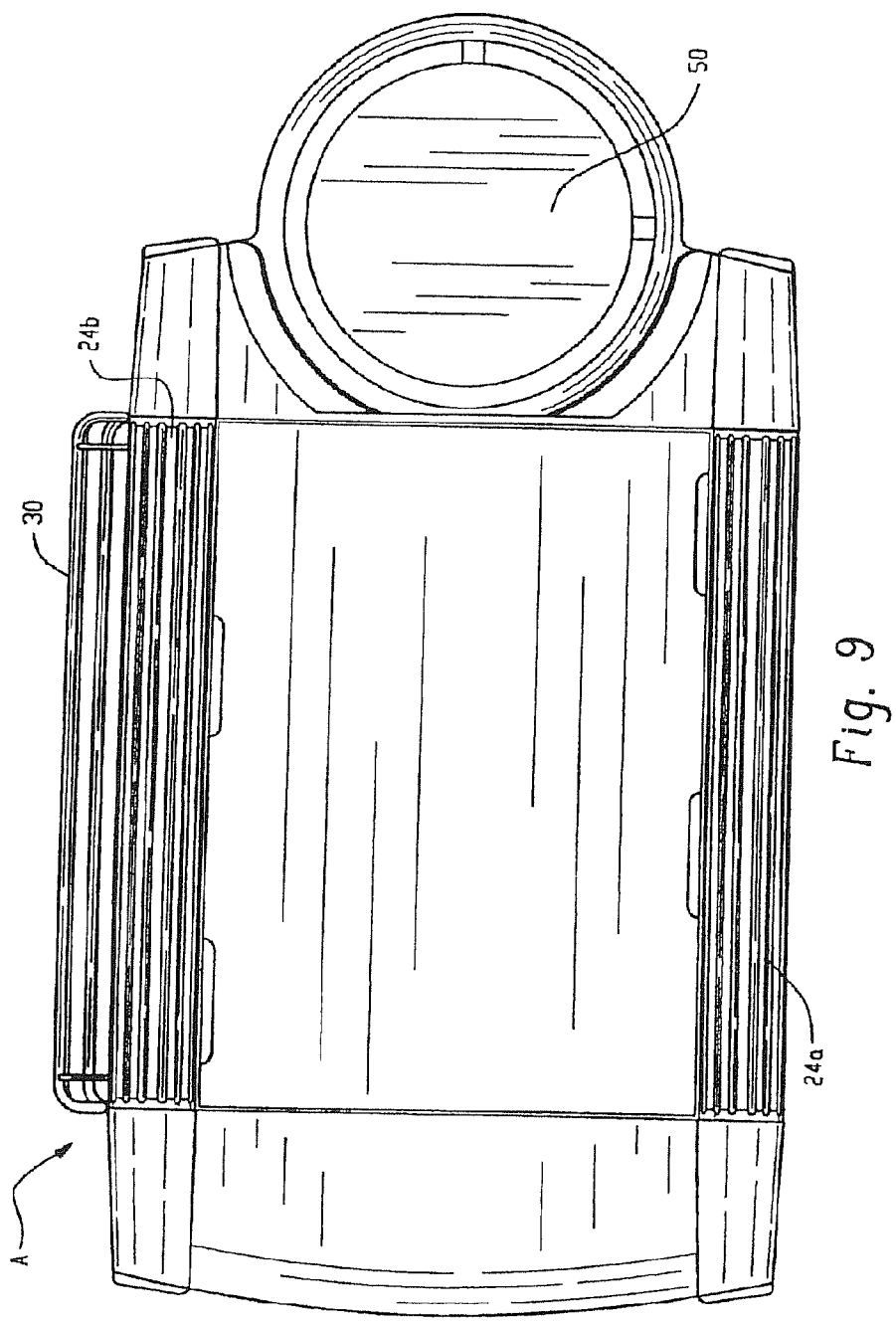
FIG. 9 is a bottom view of one implementation of a portable heater.
Figure 10:
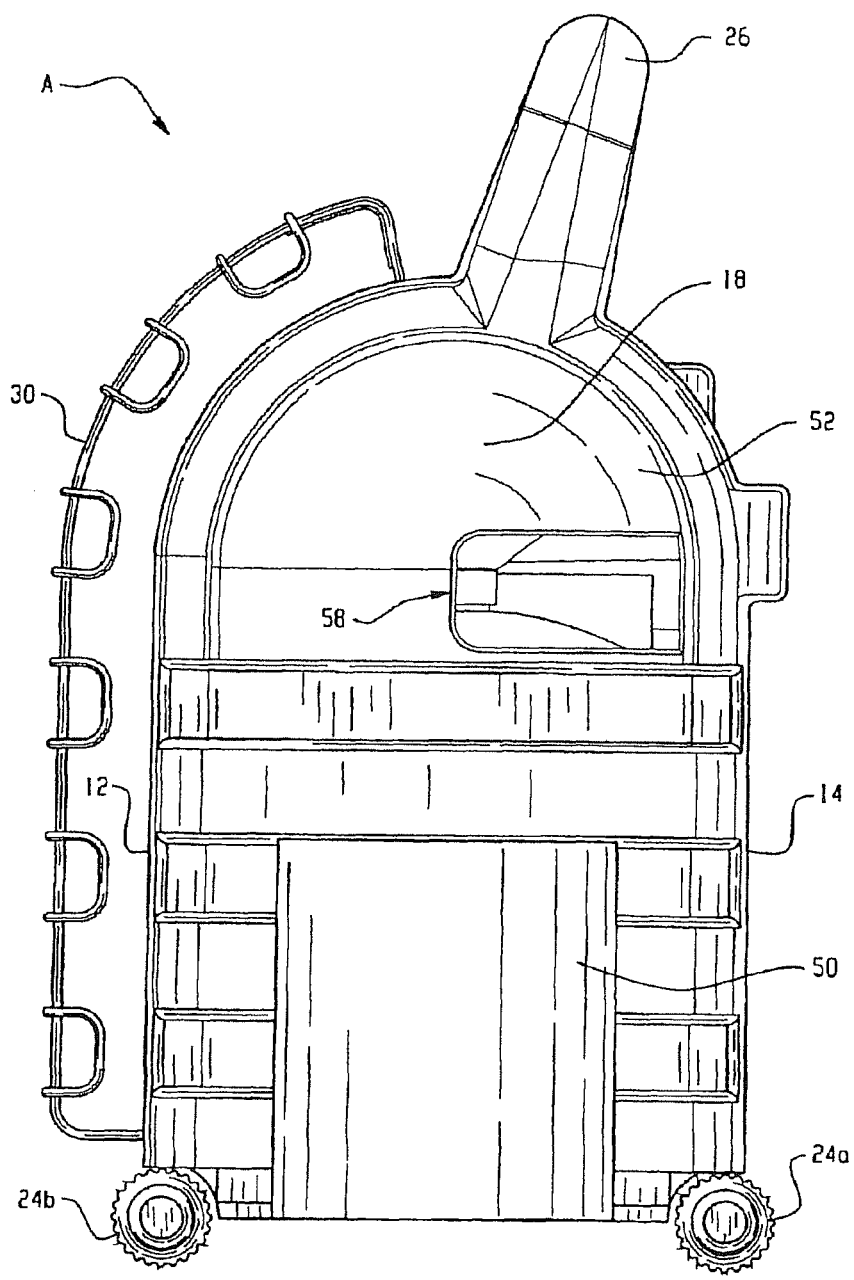
FIG. 10 is a side elevation view of one implementation of a portable heater.
Figure 11:
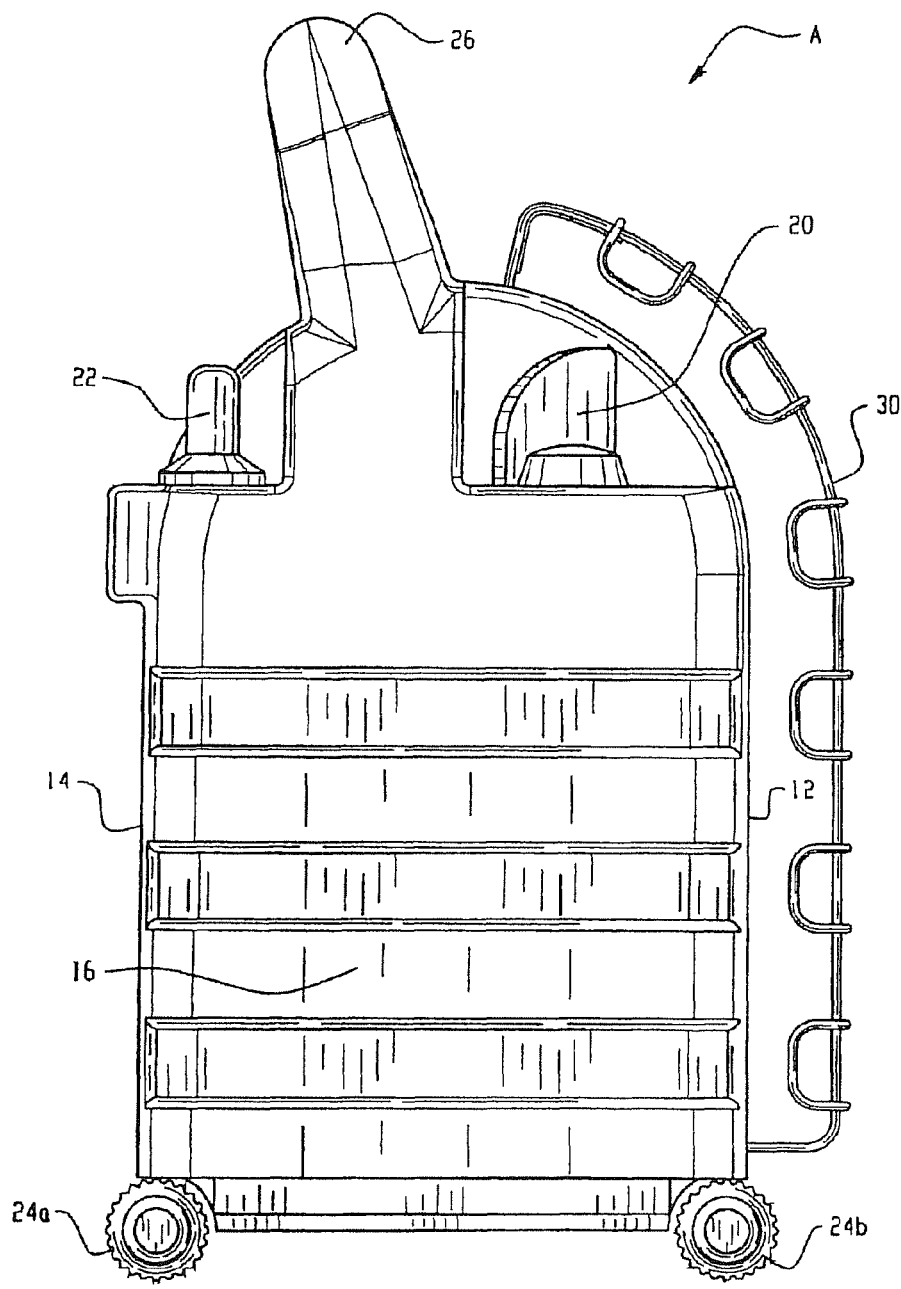
FIG. 11 is a side elevation view of one implementation of a portable heater.
Figure 12:
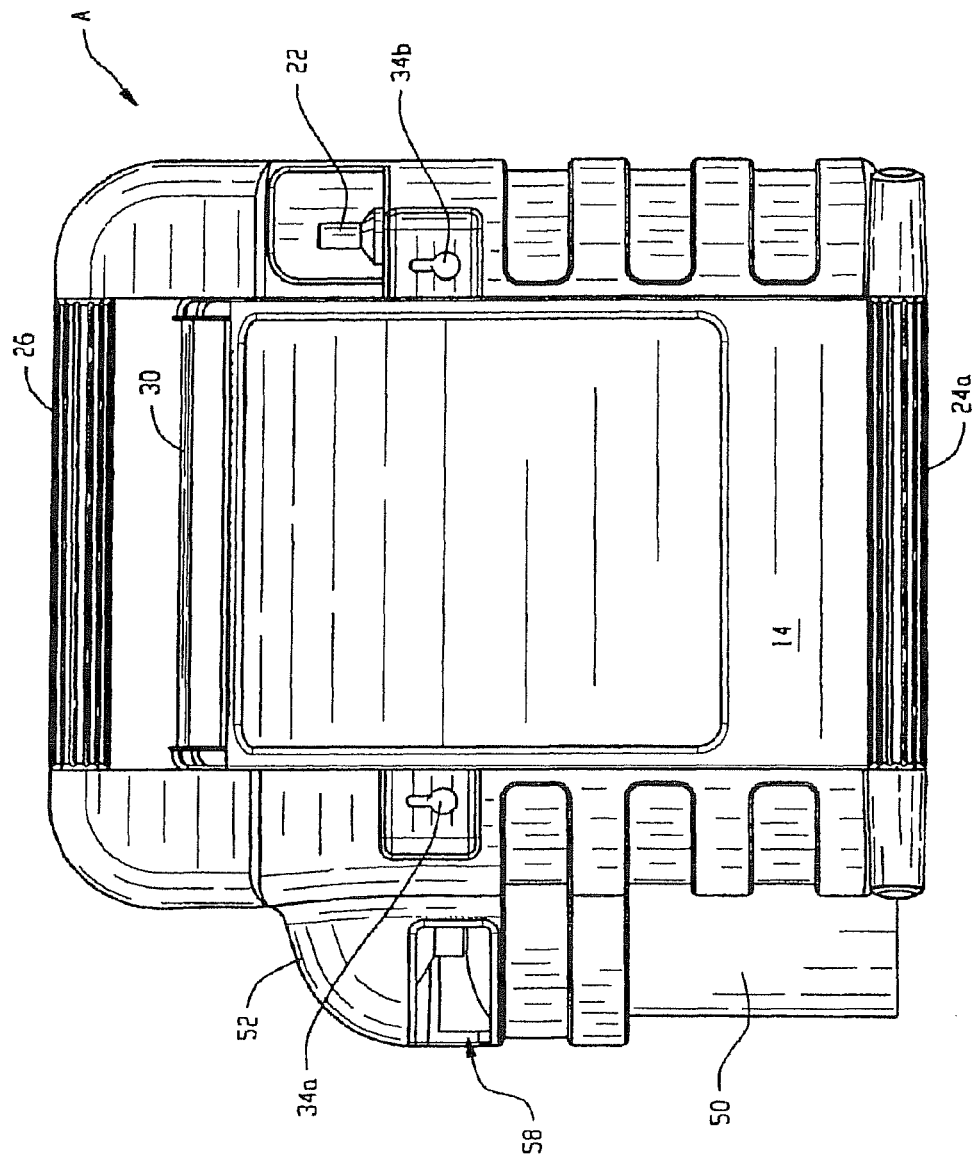
FIG. 12 is a rear elevation view of one implementation of a portable heater.
Figure 13:
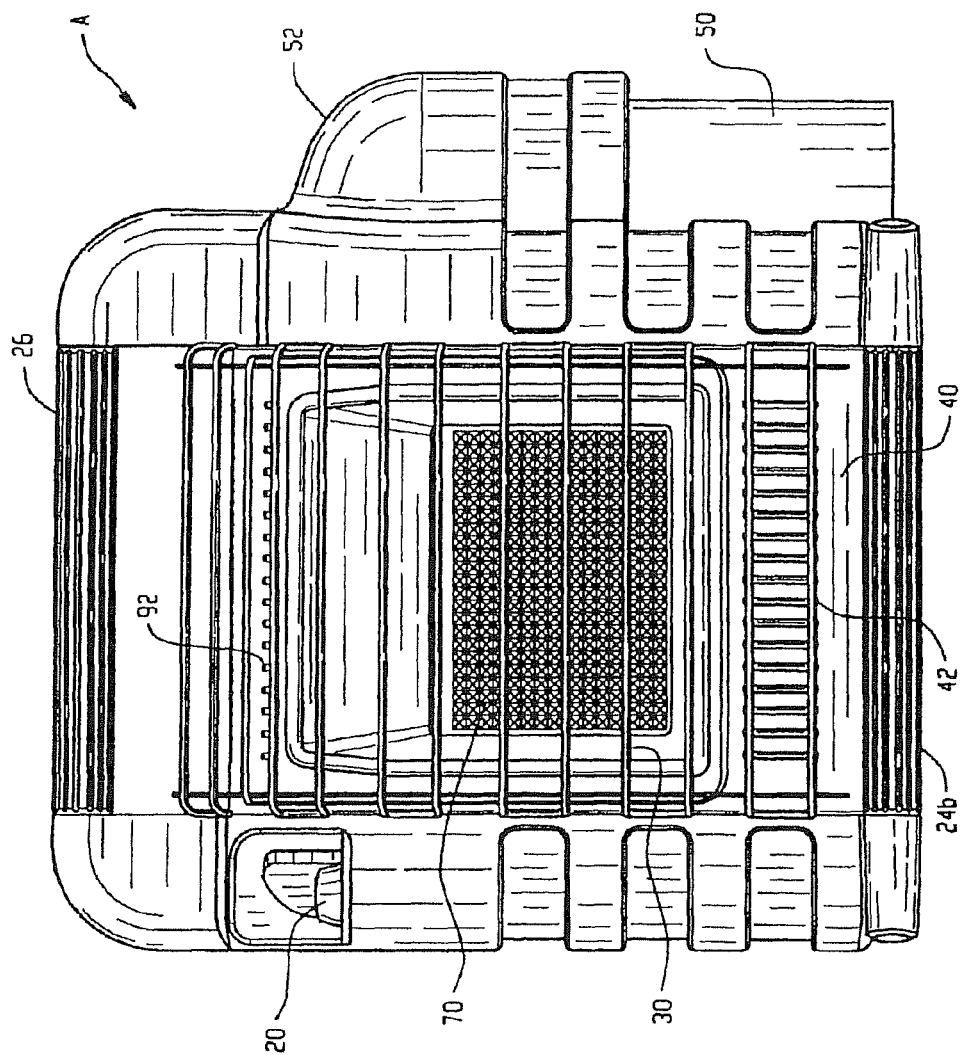
FIG. 13 is a front elevation view of one implementation of a portable heater.
Figure 14:
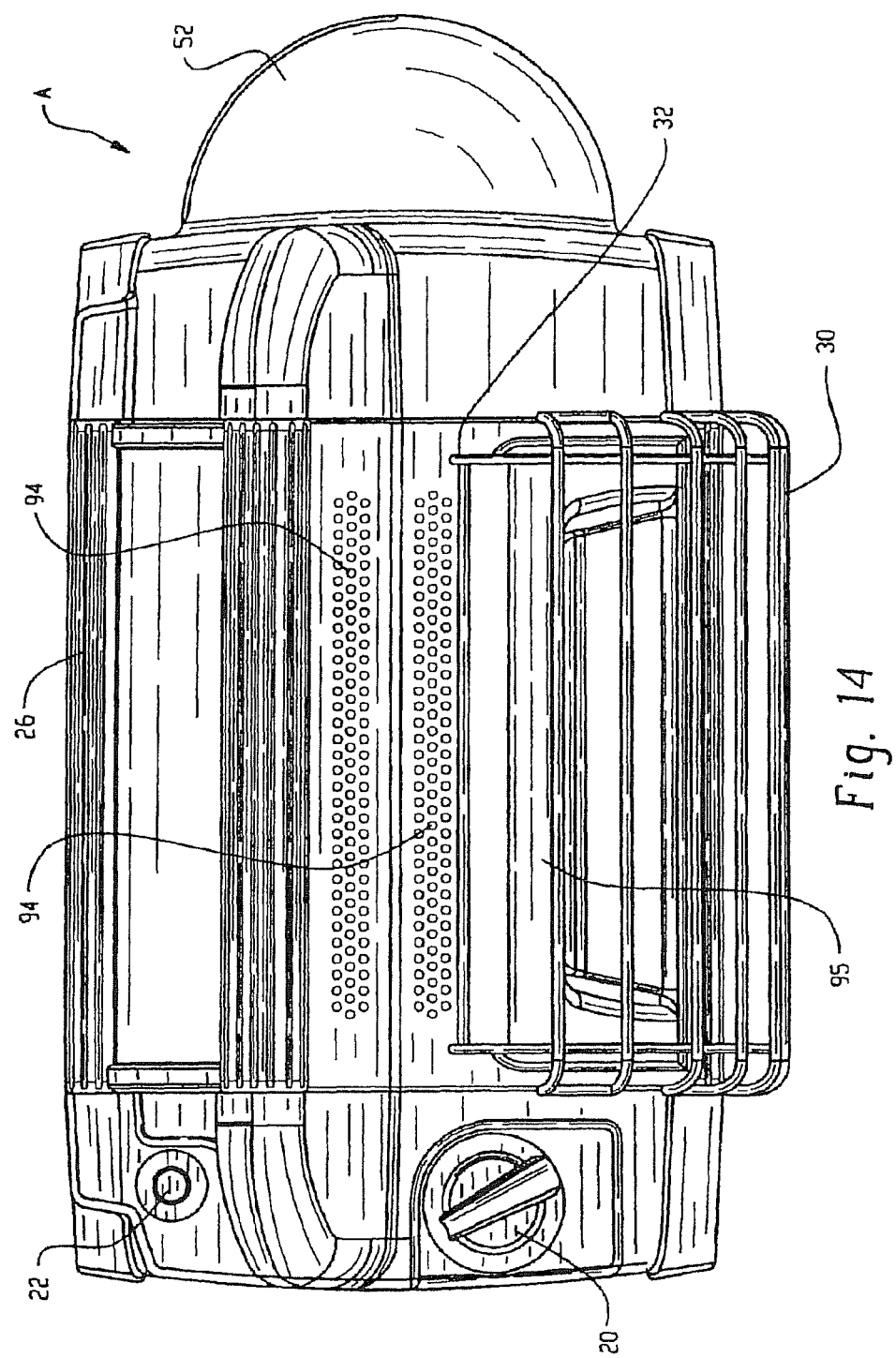
FIG. 14 is a top view of one implementation of a portable heater.

In certain implementations, an LP ("Liquefied Petroleum" or "Liquefied Propane") gas supply 50 can be secured in and partially enclosed by the housing 10 (See FIGS. 5 and 6). An LP gas supply 50 may be a removable canister or propane tank that can be replaced by a new tank or removed, refilled, and re-installed in the housing. In certain implementations, an LP gas supply can comprise a one pound propane cylinder. In certain implementations, a dome shaped portion of the housing 52 can protrude from the side 18 of the housing 10 and partially enclose the gas supply tank 50. The dome-shaped portion may provide a protective shroud that covers the interconnection of the tank with the housing. In certain implementations, an LP gas supply can comprise a twenty pound propane tank (e.g., or similar). Without limitation, a twenty pound propane tank may be connected to the heater by a length of hose so that the tank can be located apart from the heated region. Without limitation, a hose connected propane tank can be positioned outside a tent, cabin, fishing shanty garage, etc. while the heater A may be located within the structure.

The gas supply 50 can be connected to a regulator, for example, which can connect to a valve and orifice 56 (See FIG. 1), which, in-turn can be selectively adjustable between open and closed positions. Access can be provided to the regulator through window opening 58, for example, for remote LP gas supply hose tightening and leak checking (see FIG. 6). Optionally the LP gas supply hose 130 with connector fittings 132, 134 can be stored underneath the unit within receptacles 136 in combination with side ledges 138 illustrated in FIG. 27. It is recognized that the LP couplings may be "quick connects" when the supply pressure is already regulated to about 11" water column. In this implementation, the quick-coupler hose can be integrally engaged with the heater and downstream from heater regulator(s), for example, but before the control valve, in order to facilitate connection to a regulated hose supply from an external fuel source, such as a 20 pound cylinder. Similarly, as an example, the regulated fuel supply (11" water column) may be supplied from a self-contained system, such as in a recreational vehicle. The quick-coupler hose connection can incorporate positive fuel shut-off in both male and female connection components to prevent fuel escape when disconnected.

Referring again to FIGS. 1 and 2, a burner venturi 60 is enclosed within the housing 10 and is configured to mix atmospheric air (e.g., comprising oxygen) with a fuel (e.g., LP, such as propane) for combustion. The burner venturi 60 comprises a hollow, generally cylindrical body 62 and a tapered mouth 64 with a greater diameter than the body 62. The burner venturi can be disposed at an angle relative to the longitudinal axis of the heater A. The mouth 64 of the burner venturi may be positioned on approximately a same axial plane as the air inlet 40 and the cylindrical body 62 can extend upwardly from the mouth 64. The orifice 56, which may be engaged with the gas supply 50, can be disposed beneath the mouth 64 of the burner venturi 60.

Further, in one implementation, a generally planar radiant surface 70 can be disposed within the housing A, and may be disposed at an angle a relative to the longitudinal axis of the heater. A rear face of the radiant surface may be in communication with a cavity or plenum chamber 72. The plenum chamber 72 (e.g., burner plenum chamber) can receive an air-fuel mixture from the venturi, and the mixture can be distributed over and through a rear face of the radiant surface 70. Thus, in one implementation of operation, the orifice 56, engaged with the gas supply, can be opened to release a fuel (e.g., in gas form), such as propane, into the mouth 64 of the burner venturi 60. In one implementation, a regulator can be associated with the orifice, which configured to reduces a delivery pressure of the fuel gas from the source (e.g., tank) (e.g., rated up to 150 psi) to eleven inches of water column in one stage. Thus, in this implementation, the portable heater can operate at a lower pressure than may be available through other, similar units.

As an example, the stream of fuel gas exiting the orifice 56 can create a type of vacuum effect, which can cause air to be drawn in through the air inlet 40, and into the mouth 64 of the burner venturi 60. The fuel and drawn-in, atmospheric air may be mixed in the burner venturi 60 and plenum 72, which can result in a more desirable combustion (e.g., complete fuel combustion), which may result in a clean burning, infrared heating surface. The mixture of air and fuel can travel (e.g., upward) through the cylindrical body 62 of the burner venturi 60, where it may reach the plenum chamber 72. In one implementation, to mitigate exiting of the air-fuel mixture from the plenum chamber 72, or incomplete dispersal of the mixture in the chamber, a baffle 76 (e.g., non-porous baffle) can be provided, which may direct the air-fuel mixture into communication with the rear face of the radiant surface.

In one implementation, the radiant surface may comprise a burner tile or a multi-ply screen (not shown) that define a plurality of small openings which permit combustion of the air-fuel mixture as it passes therethrough. A means (e.g., an igniter comprising a piezoelectric spark generator) can be provided for initially igniting the mixture at the radiant surface. In one implementation, a container 80 houses a pilot 82 and an igniter 84 (see FIG. 3), which can provide the ignition source. It will be appreciated that any conventional igniter means for initially igniting the mixture can be utilized. Combustion of the air-fuel mixture can be maintained, and may reach elevated temperatures of approximately 1200° F. In one implementation, the exemplary heater A can comprise a single fuel canister (e.g., propane cylinder), which may be rated at a minimum 4000 BTUs, and a maximum 9000 BTUs, at eleven inches water column pressure. Other ratings and other potential alternatives are considered, including, but limited to, models comprising ratings of up to 20,000 to 25,000 BTU, such as when more than one propane cylinder and/or associated burner assemblies may be utilized.

In one implementation, a reflector 90 may extend outwardly from the top of the burner plenum 72 at an angle directed toward the top portion of the front face 12 of the housing 10. For example, a natural convective upward path of the combustion products can direct the combustion products into contact with the reflector 90. As an example, the reflector 90, in combination with the directing of the radiant energy output from the heater toward the front surface of the housing, may also act as a type of deflector that can reduce the temperature of the combustion products exiting the heater. In this example, the reduction in temperature may mitigate a chance of ignition of a combustible material that has come into proximity, or in contact, with one or more portions of the heater. In one implementation, an outlet 92 can be disposed near the top of the housing 10, which may allow warm air to mix with combustion products and exit the device after contacting the reflector 90. Additionally, a deflector 95 can be disposed on the top of the front face 12, which may also reduce the temperature of the combustion products exiting the heater.

In one implementation, an air outlet opening 94 can be disposed rearward of the outlet 92 which is in communication with the interior of the housing. The outlet 94 can provide a flow path for air (e.g., that does not enter the venturi) to flow between the inlet 40, around the rear of the plenum chamber, to the outlet, for example, exiting the housing rearward of the deflector. As an example, this outlet, in combination with the sir flow path, can enhance the chimney effect, as described above for the deflector, as a large amount of ambient air may be drawn into the housing. In this example, a portion of the incoming air may be used for combustion, and the remainder may convect (e.g., upwardly) along the rear of the plenum 72 and the deflector 95, to exit via the outlet openings 94. The air inlet 40, in one implementation, can be configured to encourage air flow along the back of a hot burner plenum 72, which may result in an increased velocity of air flow to the burner venturi, for example, while cooling the rear housing 10. In one example, as the burner venturi 60 is heated, the thermal convection properties can direct the air-fuel mixture through the upwardly angled burner venturi 60, thereby creating a chimney-type effect. As an example, the chimney effect may increase intake of fresh air flowing into the burner venturi, which can enable the pressure from the gas supply 50 to be reduced, yet burn efficiently on high or low settings.

In certain implementations the heater may comprise a carbon dioxide detector system. In one implementation, the carbon dioxide detector system can comprise a carbon dioxide detector; a printed-circuit (PC) board; and/or a power supply (e.g., battery). Without limitation, the power supply can comprise one or more batteries, such as one or more (e.g., two (2)) commercially available batteries (e.g., "D" Cell batteries, or other available sizes).

In one implementation, a carbon dioxide detector system can provide a safety function, for example, by operating to shut off the fuel supply at a predetermined operational state or desired gas range (%). In certain implementations, the carbon dioxide detector system can be configured to perform the following operations: 1) produce data indicative of atmospheric, resulting from a sensor measurement of the carbon dioxide in the atmosphere using the carbon dioxide detector 2) produce data indicative of atmospheric oxygen, resulting from a calculation of atmospheric oxygen using data from atmospheric carbon dioxide data (e.g., using a local processor, such as a computer (e.g., PC board)), 3) compare the atmospheric oxygen data to a predetermined atmospheric oxygen level, and/or 4) cause a signal output (e.g., "open valve signal") to be discontinued, if the atmospheric oxygen data meets (e.g., or exceeds) the threshold value of the predetermined atmospheric oxygen, where the output signal may be used to keep a normally closed safety valve open. As an example, if the atmospheric oxygen data indicates that the atmospheric oxygen level is lower than the predetermined atmospheric oxygen level, the safety valve can be automatically closed due to the discontinued open valve signal.

The predetermined atmospheric oxygen level may be any oxygen level. In certain implementations the predetermined atmospheric oxygen level is at least 18%.

In certain implementations, a safety interlock may be provided for the carbon dioxide detector system, whereby interruption of the functionality of a carbon dioxide detector system can result in the safety valve being closed, for example, by discontinuing a safety signal used to keep the fuel supply valve open. In certain implementations, if the carbon dioxide detector system is de-energized, for example, by removal, disruption, or failure of the power supply element, the open valve signal can be discontinued, thereby closing the safety valve.

In certain implementations a carbon dioxide detector system may operate in conjunction with a standing pilot and safety valve. Without limitation, in certain heaters comprising a carbon dioxide detector system, operable in conjunction with a standing pilot and safety valve, an operation of a pilot flame from the standing pilot can be controlled by the carbon dioxide detector system. In one example, when the atmospheric oxygen data does not meet (e.g., or exceed) the threshold (e.g., is equal to or above the predetermined atmospheric oxygen level), the carbon dioxide detector system can maintain the flame in a state that can heat a thermocouple, resulting in continued output of the open valve signal. In another example, when the atmospheric oxygen data meets (e.g., or exceeds) the threshold (e.g., is less than the predetermined atmospheric oxygen level), the carbon dioxide detector system can interrupt the open valve signal, resulting in a shutdown of the safety valve, and therefore a shutdown of the flow of fuel. In one implementation, the interruption of the open valve signal may be caused by an opening of a circuit or discontinuation of the signal production.

FIG. 17 illustrates yet another implementation of one or more portions of one or more systems described herein. In this implementation, improved air flow may be effected through heater unit A by incorporation of a paddle or cage fan 110 in a back panel 14. In one aspect shown in FIG. 16, a rechargeable power source 104 (e.g., battery pack) may be disposed within an accommodating slot 116 within a side panel 16 of the housing 10. In this implementation, a knob 106 can be used to variably define the power setting used with power source 104, and may also be used as an "on/off" switch, for controlling the speed of a fan 110. Alternatively, in one implementation, at least one (e.g., two or more) rechargeable dry cell batteries, 108a, 108b can be disposed within the side panel 16 of the housing 10, as illustrated in FIG. 17. As an example, the batteries may be positioned to be loaded from a bottom of housing 10, and the power setting can be controlled by a variably positioned knob 106 disposed toward a front of the housing 10, or at an alternative position as is known in the art for controlling variable amounts of power to an electrical device.

Figure 26:
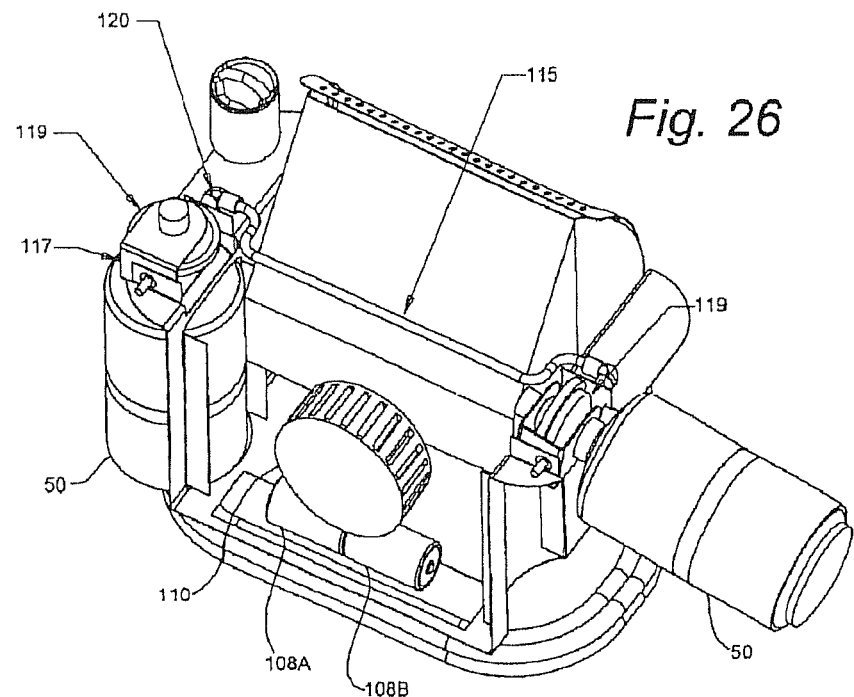
FIG. 26 is a rear perspective view one or more portions of a heater assembly.
Figure 27:
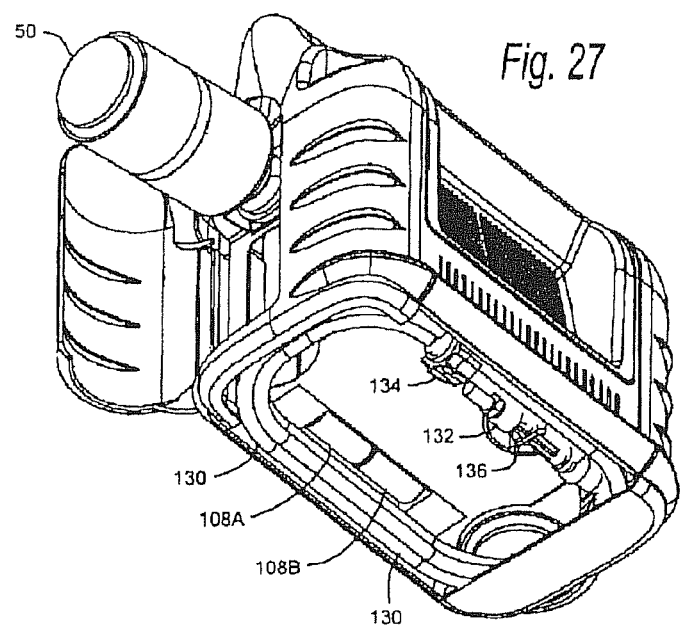
FIG. 27 is a bottom perspective view illustrating a one or more portions of a heater assembly.

As an example, a desired rotational speed of the fan, coupled with expected battery life, may dictate a number, size and power output requirements of the power source. For example, anywhere from one to four "C" or "D" sized batteries may be employed, although it is equally envisioned that "AA" batteries may be used in some models where power consumption is envisioned to be lower or usage infrequent and for short duration. In one implementation, fan 110 comprises a plurality of paddles, or inwardly extending panels, for creating air movement through rotational pivotal movement about axis 114. As an example, the fan may comprise a low voltage fan (e.g., 3.0 VDC) powered by a direct current motor. For example, an increased air flow created by the fan may provide additional cooling capacity on various metal and plastic components of heater A. As another example, implementation, battery operation is illustrated in FIG. 26, where an alternative dry cell location is identified.

Figure 19:
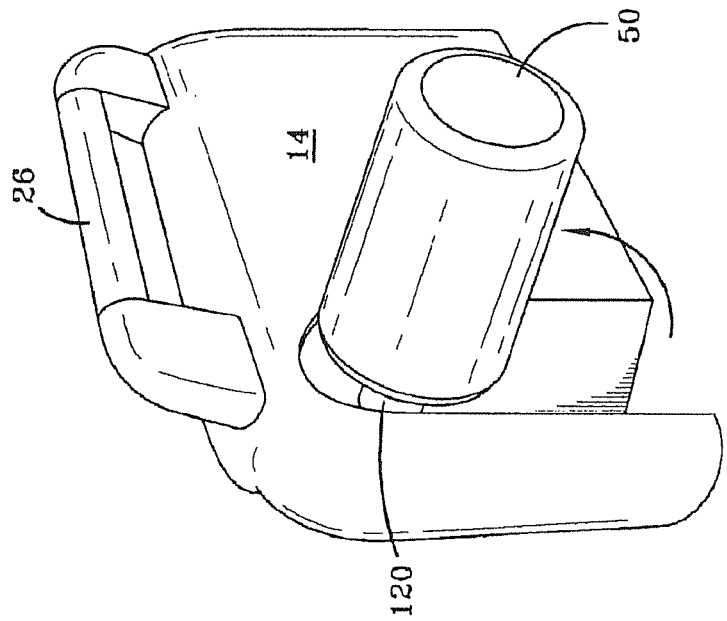
FIG. 19 is a perspective view of one implementation of a portable heater.
Figure 18:
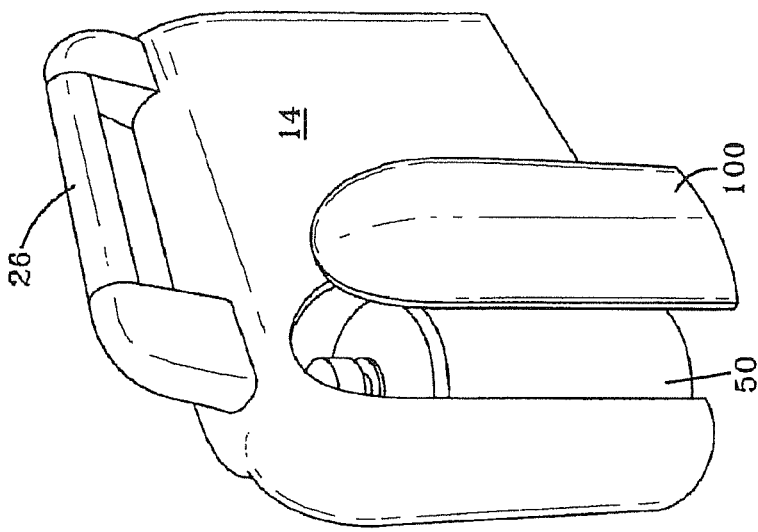
FIG. 18 is a perspective view of one implementation of a portable heater.

FIGS. 18-19 illustrate another implementation of one or more portions of one of more devices described herein. In this implementation, a snap-fit door 100 may be removable from the side panel 18.

Figure 20:
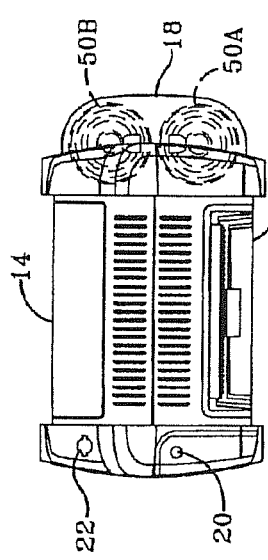
FIG. 20 is a top elevation view of one implementation of a portable heater.
Figure 21:
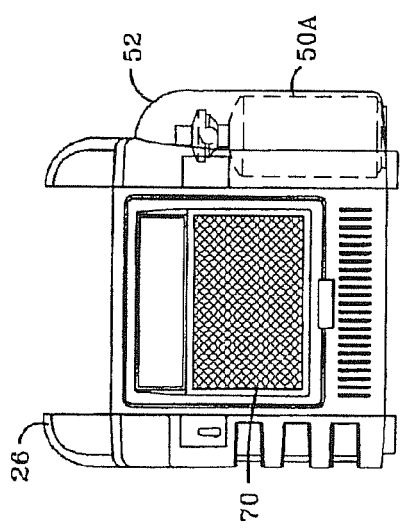
FIG. 21 is a front elevation view of one implementation of a portable heater.

FIGS. 20-27 illustrate yet another implementation of one or more portions of one of more devices described herein. In this implementation, more than one fuel source may be disposed within the housing. For example, as illustrated in FIG. 20, two fuel sources 50a, 50b are disposed within side wall 18 and, at least partially, covered by a dome-shaped shoulder portion of the housing; and in one aspect, completely enclosed therein, as illustrated in FIG. 21. In this implementation, a temperature controller button 20 and igniter button 22 are disposed similarly to that shown previously in FIG. 4.

Figure 22:
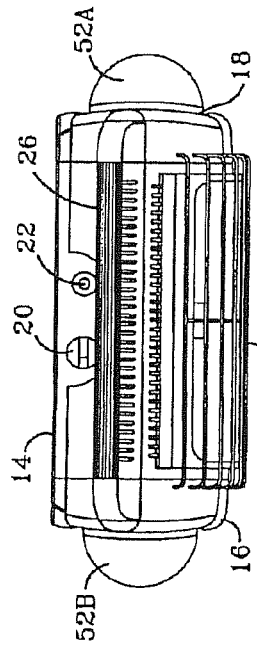
FIG. 22 is a top elevation view of one implementation of a portable heater.
Figure 23:
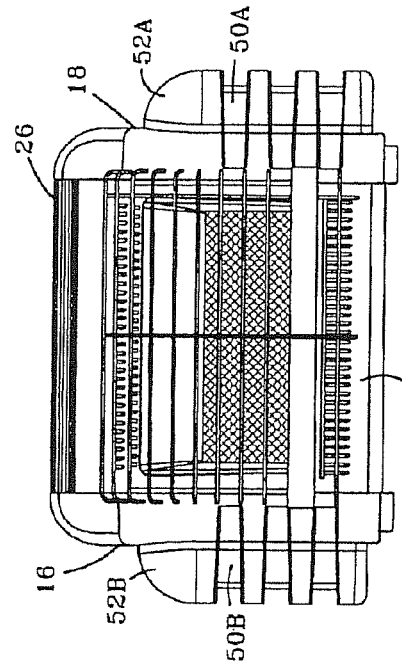
FIG. 23 is a front elevation view one or more portions of a heater assembly.

In one implementation, as illustrated in FIGS. 22-23, two fuel sources 50a, 50b, which are at least partially enclosed by the dome-shaped portion of the side panels 52a, 52b, may be disposed on opposed sides 18, 16 of heater housing 10. In this particular implementation, the two fuel sources 50a, 50b can be disposed in fluid communication with a mixing valve (not shown); and the temperature controller button 20 and igniter button 22 can be configured to control a single burner unit.

Figure 24:
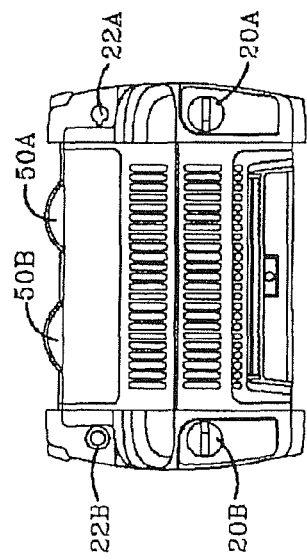
FIG. 24 is a top elevation view of one implementation of a portable heater.
Figure 25:
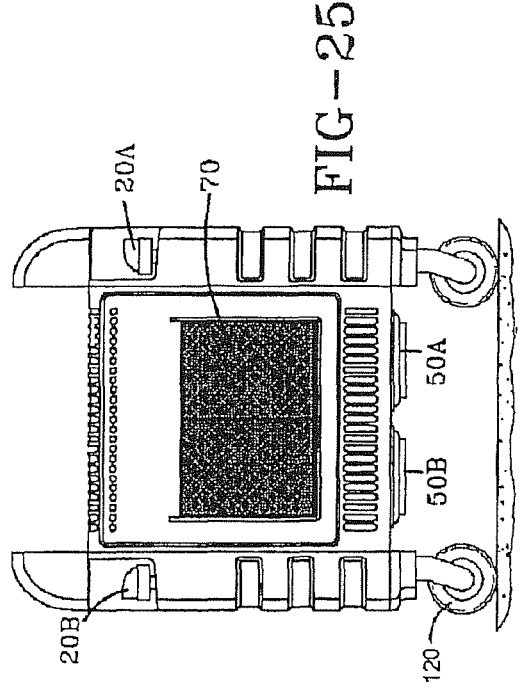
FIG. 25 is a front elevation view of one or more portions of a heater assembly.
Figure 15:
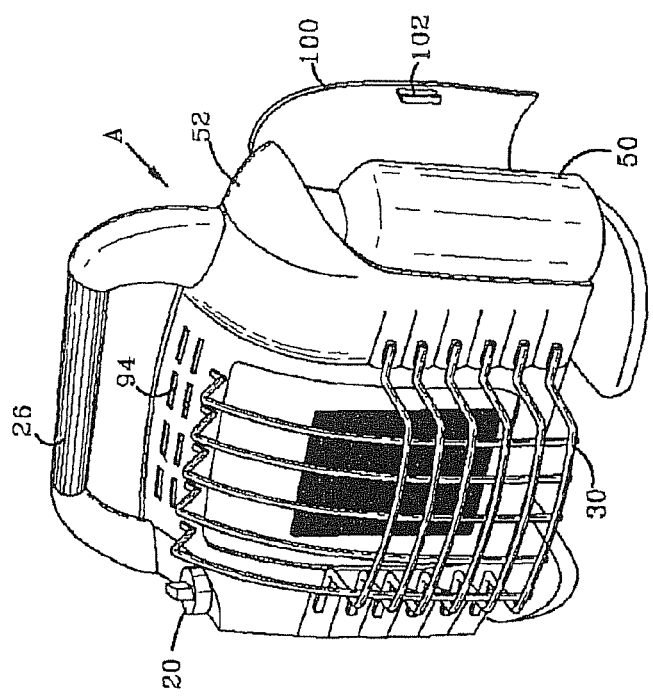
FIG. 15 is a perspective view of one implementation of a portable heater.
Figure 16:
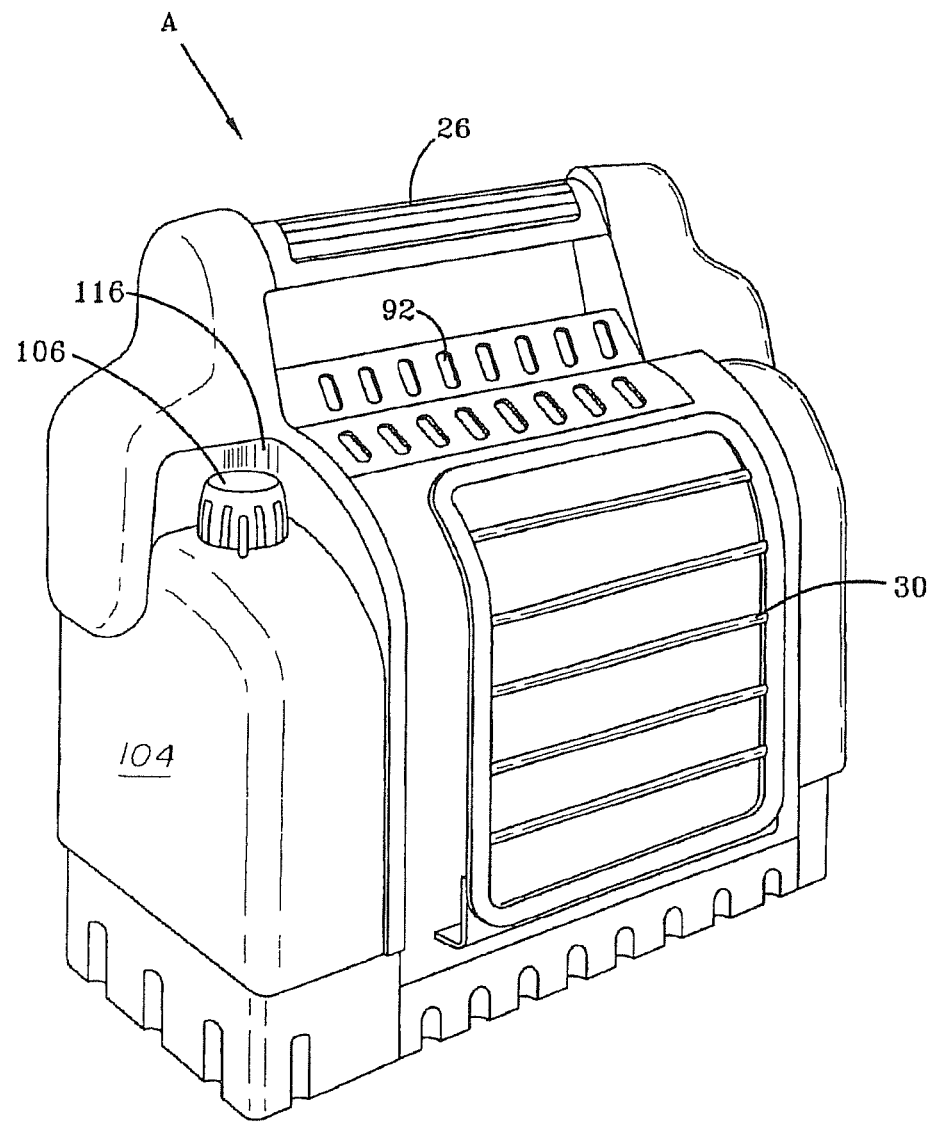
FIG. 16 is a perspective view of one implementation of a portable heater.

In one implementation, as illustrated in FIGS. 24-25, two fuel sources 50a, 50b may protrude, at least partially, from the rear 14 of heater housing 10. As illustrated in this implementation, respective fuel sources have corresponding, individual temperature controller buttons 20a, 20b, and corresponding, individual igniter buttons 22a, 22b, which may be used to control the temperature of heater A.

It is recognized that when dual fuel source applications are discussed, it is recognized that the heat capacity of each burner need not be the same, and it is within the scope of this disclosure that different capacity burners are envisioned. For example, desired heat control by a user, it is anticipated that at least one burner may be used for a lower desired heating capacity; and the second burner may be used for a higher heating capacity. Further, it is anticipated that the two burners can be used in combination to produce yet a higher heating capacity. As an example, other implementations may comprise two lower capacity burners employed within one unit, and/or as applications where that utilize two higher capacity burners employed within the same unit. In yet another implementation, two continuously variable burners may be employed, for example, where such variability can be predicated by a rate at which fuel and/or air is supplied to the burners, as well as the capacity of the burners.

While the gas-fired heater with carbon dioxide detector has been described above in connection with the certain implementations, it is to be understood that other implementations may be used or modifications and additions may be made to the described implementations for performing the same function of the gas-fired heater with carbon dioxide detector without deviating therefrom. Further, all implementations disclosed are not necessarily in the alternative, as various implementations may be combined to provide the desired characteristics. Variations can be made by one having ordinary skill in the art without departing from the spirit and scope of the gas-fired heater with carbon dioxide detector. Therefore, the gas-fired heater with carbon dioxide detector should not be limited to any single implementation, but rather construed in breadth and scope in accordance with the recitation of the attached claims.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one implementation" or "an implementation" means that a particular feature, structure, or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A portable gas-fired heater comprising:
   a housing configured to at least partially enclose at least a first fuel source;
   a burner assembly disposed in the housing; and
   a carbon dioxide detector system comprising:
      a standing pilot configured to produce a pilot flame;
      a processor configured to:
         determine a level of atmospheric carbon dioxide based at least on data indicative of an identified temperature of the pilot flame; and
         determine a level of atmospheric oxygen based at least on data indicative of the level of atmospheric carbon dioxide.

2. The heater of claim 1, the burner assembly disposed in the housing comprising one or more of:
   a gas valve configured to receive fuel from at least the first fuel source;
   an orifice in fluid communication with the gas valve;
   an air inlet in fluid communication with the environment outside the housing;
   a venturi in fluid communication with the orifice, and in fluid communication with the air inlet, the venturi configured to mix air from the air inlet and fuel from the orifice into a fuel-air mixture; and
   a combustion region configured to provide a combustion site for the air-fuel mixture, comprising one or more of:
      a rear face in fluid communication with the venturi, and
      a radiant surface.

3. The heater of claim 2, the carbon dioxide detector system comprising one or more of:
   a safety valve; and
   a power source configured to provide power to the processor.

4. The heater of claim 3, the carbon dioxide detector system comprising a temperature sensor configured to detect a temperature of the pilot flame.

5. The heater of claim 3, the standing pilot configured to produce a pilot flame, the heat produced by the pilot flame indicative of an amount of atmospheric carbon dioxide present.

6. The heater of claim 1 the first fuel source comprising at least two propane fuel tanks, wherein the propane fuel tanks are at least partially enclosed in the housing.

7. The heater of claim 1 further comprising
   a fan; and
   a power source for the fan.

8. The heater of claim 7 the power source comprising one or more of:
   a dry cell battery; and
   a battery pack.

9. The heater of claim 1 comprising an elongated hose assembly configured to provide fluid communication between the heater and a second fuel source.

10. The heater of claim 1 comprising:
    a fan configured to increase air circulation through the heater; and
    a power source configured to power the fan, the power source comprising one or more of:
       a dry cell battery; and
       a battery pack.

11. The heater of claim 1 the first fuel source comprising at least two propane fuel tanks, the propane fuel tanks are completely enclosed within the housing.

12. The heater of claim 1, the first fuel source comprising at least two propane fuel tanks, a first propane tank comprises a first temperature controller and a first igniter and a second propane tank comprises a second temperature controller and a second igniter.

13. A portable gas-fired heating device, comprising:
a housing configured to at least partially enclose at least a first fuel source;
a burner assembly disposed in the housing; and
a carbon dioxide detector system comprising a processor configured to:
determine a level of atmospheric carbon dioxide based at least on data indicative of a detected temperature of a standing pilot; and
determine a level of atmospheric oxygen based at least on data indicative of the level of atmospheric carbon dioxide;
the carbon dioxide detector system configured to cause a fuel supply valve to be shut when a non-desired atmosphere is detected, the non-desired atmosphere comprising one or more of:
an elevated level of atmospheric carbon dioxide; and
a reduced level of atmospheric oxygen.

14. The device of claim 13, the carbon dioxide detector system comprising a standing pilot configured to produce a pilot flame, the pilot flame configured to heat an associated temperature sensor.

15. The device of claim 14, the heat produced by the pilot flame indicative of an amount of atmospheric carbon dioxide present.

16. The device of claim 13, the carbon dioxide detector system comprising a power source configured to provide electrical power to the processor.

17. The device of claim 13, the carbon dioxide detector system comprising a safety valve configured to close a fuel supply to the device upon cessation of receipt of an open valve signal, the open valve signal indicative of an atmosphere that does not comprise an elevated level of carbon dioxide or a reduced level of oxygen.

18. A method of manufacturing a portable gas-fired heating apparatus, comprising:
producing housing that is configured to at least partially enclose at least a first fuel source;
disposing a burner assembly in the housing; and
disposing a carbon dioxide detector system in operational engagement with at least the first fuel source, the carbon dioxide detector comprising:
a standing pilot configured to produce a pilot flame, the pilot flame configured to heat an associated temperature sensor, the heat produced by the pilot flame indicative of an amount of atmospheric carbon dioxide present;
a processor configured to:
determine a level of atmospheric carbon dioxide based at least on data indicative of the temperature of the temperature sensor; and
determine a level of atmospheric oxygen based at least on data indicative of the level of atmospheric carbon dioxide;
a power source configured to provide electrical power to the processor; and
a safety valve configured to close a fuel supply to the device upon cessation of receipt of an open valve signal, the open valve signal indicative of an atmosphere that does not comprise an elevated level of carbon dioxide or a reduced level of oxygen.

* * * * *